United States Patent [19]
Billard et al.

[11] Patent Number: 5,602,362
[45] Date of Patent: Feb. 11, 1997

[54] ELECTROMAGNETIC DECOY WITH DELAYED EJECTION

[76] Inventors: Alain A. Billard, 65, Av. Saint Germier; André R. Santalucia, 3, rue Pierre Capelle, both of Muret, France, 31600

[21] Appl. No.: 447,773

[22] Filed: Dec. 9, 1982

[30] Foreign Application Priority Data

Dec. 11, 1981 [FR] France ................... 81-23196

[51] Int. Cl.⁶ ................. F42B 4/26; F42B 4/14; B64D 1/04
[52] U.S. Cl. ............ 102/357; 89/1.51; 89/1.57; 102/342; 102/345; 102/351; 102/352; 102/360; 102/505; 342/12
[58] Field of Search ............... 89/1.5 R, 1.5 F; 102/342, 345, 351, 352, 357, 360, 505; 343/18 E; 220/261

[56] References Cited

U.S. PATENT DOCUMENTS

| | | | |
|---|---|---|---|
| 3,430,533 | 3/1969 | Kifor et al. | 102/505 |
| 3,511,457 | 5/1970 | Pogue | 89/1.5 R |
| 3,674,174 | 7/1972 | Crewe | 102/342 |
| 3,808,940 | 5/1974 | Schillreff et al. | |
| 3,841,219 | 10/1974 | Schillreff | 102/342 |
| 3,899,975 | 8/1975 | Lawrence | 343/18 E |
| 3,964,393 | 6/1976 | Foote et al. | 102/342 |
| 4,063,485 | 12/1977 | Carter et al. | |
| 4,171,669 | 10/1979 | Allen | 102/342 |
| 4,222,306 | 9/1980 | Maury | 102/505 |
| 4,374,494 | 2/1983 | Maury | 102/351 |
| 5,040,465 | 8/1991 | Maury | 102/505 |

FOREIGN PATENT DOCUMENTS

| | | |
|---|---|---|
| 2507306 | 12/1982 | France . |
| 1302872 | 1/1973 | United Kingdom . |
| 1426229 | 2/1976 | United Kingdom . |
| 1489988 | 10/1977 | United Kingdom . |
| 1584438 | 2/1981 | United Kingdom . |
| 2062817 | 5/1981 | United Kingdom . |

*Primary Examiner*—Michael J. Carone
*Assistant Examiner*—Theresa M. Wesson

[57] ABSTRACT

The member bearing electromagnetic decoys comprises a sliding member (23 to 27) having an open major face closed by a cover of which an extension projects opposite an opening (21A) in a compartment (21) provided for a pyrotechnic portion. When the pyrotechnic charge there disposed has caused ejection of the decoy-bearing sliding member, and after a given delay, it will act on the extension of the cover in order to remove the latter and thereby release it from the electromagnetic decoys. This ensures that the decoys are deployed at the end of a given delay after ejection of the decoy-bearing member from the aircraft.

8 Claims, 3 Drawing Sheets

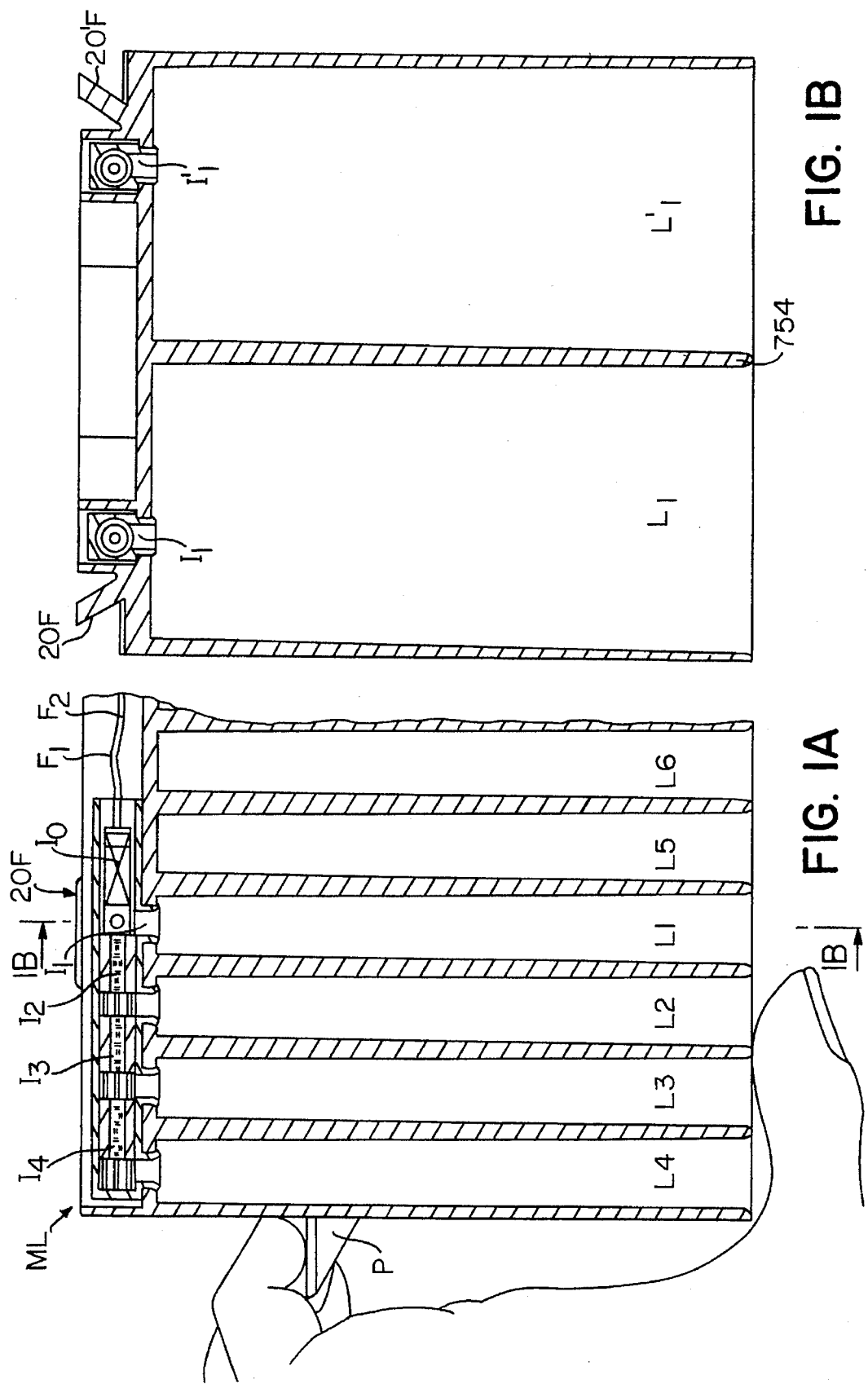

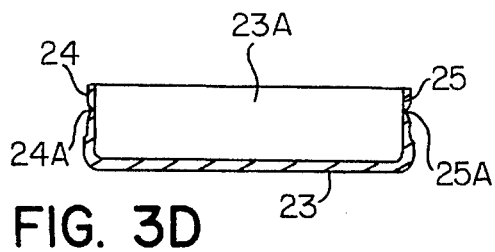
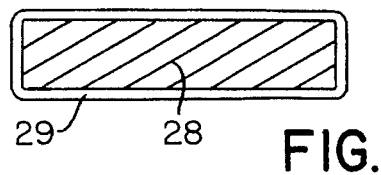
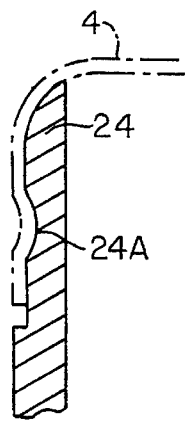
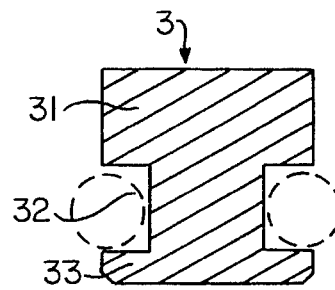
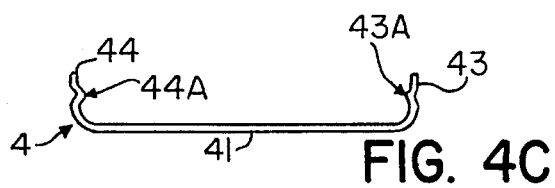
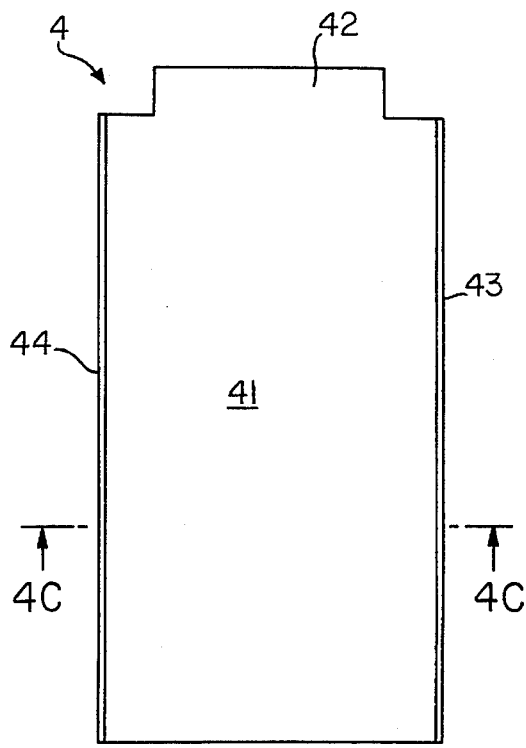
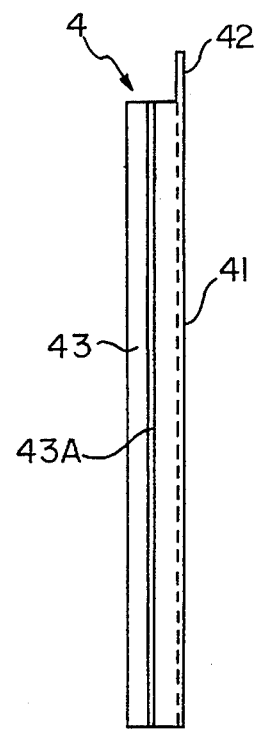

ELECTROMAGNETIC DECOY WITH DELAYED EJECTION

The present invention relates to the utilisation of electromagnetic decoys; more particularly, it concerns the protection of aircraft against radar-guided missiles, "radar auto-directors" and radar-guided predictors.

In their U.S. Pat. No. 4,517,896, the applicants proposed a device for launching electromagnetic decoys which comprises a launching structure equipped with at least one group of cells for housing respective decoy-bearing members and with at least one device for the initiation and nonsimultaneous transmission of ignition towards the respective cells, whereas each decoy-bearing member comprises a sliding case open on one of its major faces and associated with an ejection charge placed in ignition position relative to the said ignition transmission. This device makes it possible to deploy in the desired sequence, and in the vicinity of the aircraft, a plurality of decoy charges, while avoiding the use of slow pyrotechnic charges and the effects of instantaneous recoil which tend to produce compression within each decoy charge. Another object of the device is to produce a slow, progressive increase in the radar equivalent surface level, for maximum effectiveness in high-speed auto-director pursuit, combined with an abrupt cut-off designed to promote break-off of the pursuit.

An object of the present invention is to improve this device. In particular, it aims to simulate a trajectory which deviates transversely from the actual trajectory of the aircraft, and to do this with credible deceleration while maintaining correct deployment of each decoy charge.

To this end, in the device proposed, each decoy-bearing member also comprises a cover clipped onto its sliding case to close the open major face of the latter, and means for delayed-action ignition transmission energised by means of the charge for ejecting the decoy-bearing member and arranged to produce delayed removal of the cover.

According to another feature of the invention, each decoy-bearing member comprises, at both ends of the sliding case, a peripheral groove receiving a resilient air-filled hollow seal, these seals having a retaining action to slow down the ejection of the sliding case from its cell.

For applications such as the deception of auto-guided missiles pursuing an aircraft, the various decoy-bearing members in a group are provided with staggered cover removal delays in accordance with their respective ejection delays.

In a variant offering greater deception, at least two groups of cells are provided and are designed to eject in intercalary manner two groups of decoy-bearing members having different cover removal delays. This performs the above-mentioned simulation very effectively, even in the case of high-performance modern radar auto-directors, where the observed radial velocity is high.

Further features and advantages of the invention will be apparent from the ensuing detailed description and from the accompanying drawings, in which:

FIGS. 1A and 1B illustrate groups of cells in a launching structure for electromagnetic decoys;

FIGS. 3A to 3E represent respectively an elevation, plan view, view from the right, and horizontal sections along lines 3D and 3E through a preferred embodiment of the sliding case in accordance with the invention, whereas FIG. 3F shows a detail from FIG. 3D;

FIGS. 4A to 4C represent respectively an elevation, view from the right and view from below of an embodiment of the cover for the decoy-bearing member; and FIG. 5 illustrates on a larger scale the ejector piston for removing the cover of the decoy-bearing member.

In FIG. 1A, references $L_1$ to $L_4$ designate a group of cells for respective identical decoy-bearing members. As shown in the section in FIG. 1B, these cells are flat and substantially parallelepipedal, although slightly narrower at the bottom of the cell than at its open end to facilitate moulding. FIG. 1A also shows an electrical initiator $I_0$ which can be energised by way of two control wires $F_1$ and $F_2$. The initiator $I_0$ communicates directly with an orifice $I_1$ for transmitting ignition to the cell $L_1$. A first pyrotechnic delay means $I_2$ will transmit ignition to the corresponding orifice of the next cell $L_2$, and so on, with delay means $I_3$ for cell $L_3$, $I_4$ for $L_4$ and possibly other delays for other cells. FIGS. 1A and 1B show cells $L_5$ and $L_6$ belonging to another group and a cell $L'_1$ placed opposite cell $L_1$ and in line with it on the section line 1B in FIG. 1A. The orifice $I'_1$ used for energising the charge in cell $L'_1$ is also shown. Lastly, FIGS. 1A and 1B illustrate members 20F and 20'F designed to act as dovetails in the attachment of the decoy launching module ML to a support structure in an aircraft.

In this connection reference is made to the above-mentioned French Patent Application No. 81 10 977, the descriptive content of which should be regarded as included in the present description in order to supplement the latter where necessary.

The remainder of this description will be directed to a single decoy-bearing member, for example, that housed in cell $L_1$.

As shown in FIGS. 2A to 2E and 3A to 3F, each decoy-bearing member preferably comprises a pyrotechnic portion generally designated 1 and a sliding portion generally designated 2, to the end of which the pyrotechnic portion is attached, for example by ultrasonic welding.

Figure 2A:
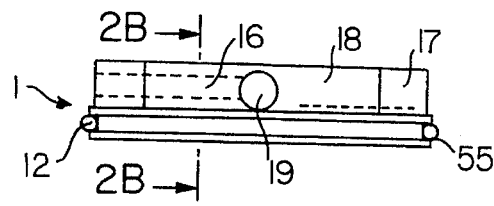
FIGS. 2A to 2E represent respectively an elevation, cross-section, plan view, view from below, and longitudinal section of the pyrotechnic portion of a decoy-bearing member in accordance with the present invention.
Figure 2B:
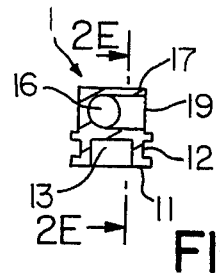
Figure 2C:
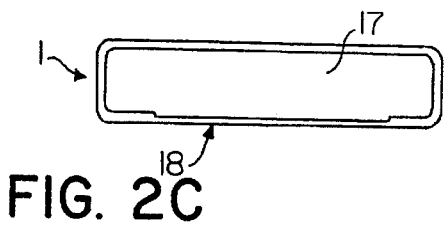
Figure 2D:
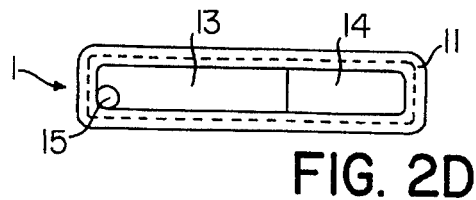
Figure 2E:
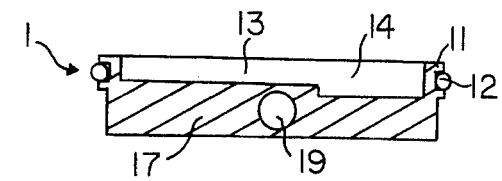
Figure 3B:
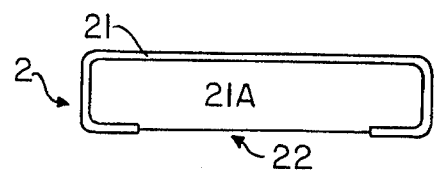
Figure 3A:
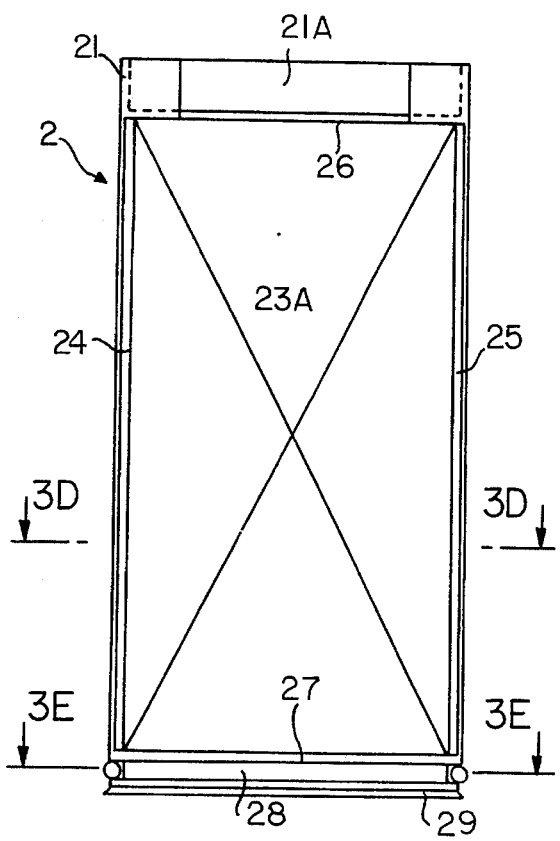

As FIG. 3A shows, the sliding portion 2 has at the top a compartment defined by a peripheral wall 21 and open at 21A. This compartment receives the base 17 of the pyrotechnic portion shown in FIGS. 2A to 2E.

That part of the pyrotechnic portion remote from this base 17 comprises a peripheral collar 11 defining on its exterior a groove 12 for an O-ring seal (not shown), preferably a resilient air-filled hollow seal. On its interior the collar 11 defines a compartment generally designated 13 for a pyrotechnic charge. A deeper portion 14 extends the compartment 13 on the right. On the right (FIGS. 2A and 2D) the compartment 13 communicates with an axial bore 15 linked in turn to a transverse bore 16 which runs parallel to the major side and leads to a bore 19, also transverse but parallel to the minor side. The bore 19 (FIGS. 2A, 2B and 2E) leads to a portion 18 having a recessed surface and belonging to the base 17 of this pyrotechnic portion of the decoy-bearing member. Lastly, the bore 19 houses an ejector piston 3 (FIG. 5). The portion 33 of this piston, of which the edges are chamfered at 45°, faces inwards; this portion followed by a shoulder 32 housing an O-ring seal, which may be of the same type as the seal mentioned above, and followed by a portion 31 of the same diameter the portion 33. This portion 31 is designed to be substantially flush with the exit from the bore 19.

The portion 14 of the compartment for the principal pyrotechnic charge constitutes an extension of the latter on the side where this does not interfere with the ducts 15, 16 and 19. As to the pyrotechnics, the compartments 13, 14 are filled with the pyrotechnic charge for ejecting the decoy-bearing sliding case. On utilisation of this charge, ignition is transmitted by the duct 15 to a pyrotechnic delay charge situated in the duct 16, and after the delay determined by it this charge in turn will cause the piston 3 to be ejected from the cell 19. For design reasons the bore 16 is open to the exterior and is normally closed after insertion of the pyrotechnic delay charge by a plug (not shown).

Reference will now be made to FIGS. 3A to 3E, which illustrate the sliding portion (the actual decoy-bearing part of the decoy-bearing member). Apart from the compartment 21 for the pyrotechnic charge, already described, this sliding portion comprises a five-sided box with a back 23, two major sides 24, 25 and two minor sides 26, 27, the remaining major face (opposite the back 23) being open.

Figure 3C:
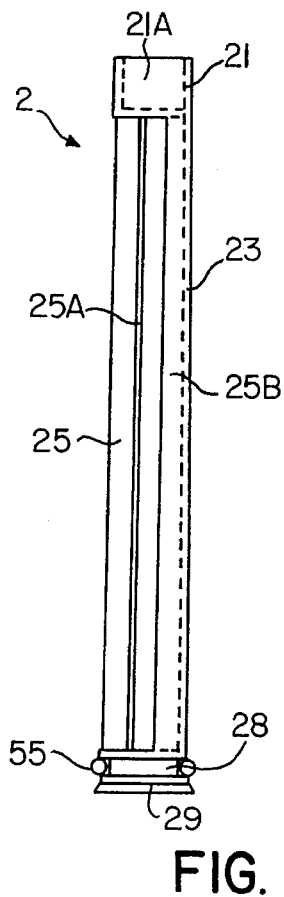

The end remote from the compartment 21 contains another groove 28, also designed for a resilient air-filled hollow seal such as shown at 55 as mentioned above, and followed by a shoulder 29 which also acts as closing means for the cell such as $L_1$ when the decoy-bearing member is in position. As FIG. 3C shows, the major side 25 has a recessed surface, the normal line being defined by the portion 25B extending the elements 21 and 29 of the case. The zone 25 with the recessed surface contains a longitudinal groove 25A, best seen in FIG. 3D or alternatively in FIG. 3F (where it bears reference 24A as it belongs to the other side).

The compartment 21 of the pyrotechnic portion is open at 21A to leave room for the recessed zone 18. Lastly, as FIG. 3C also indicates, the edges of the sides 24, 25 are set slightly back from the overall profile of the sliding case.

FIGS. 4A to 4C are detailed representations of the cover of the decoy-bearing member. The cover has a major face 41 to go over the sliding case shown in FIG. 3A. At the edges this major face 41 is provided with two sides 43, 44, each bearing longitudinal projections 43A, 44A designed to clip into the grooves 24A, 25A already mentioned. Lastly, the major face 41 of the cover bears an extension corresponding to the recess 21A and designed to bear on the pyrotechnic portion at the exit from the bore 19.

The device just described operates in practice as follows.

a) When the initiator $I_0$ (FIG. 1A) is energised, ignition is immediately transmitted by the passage $I_1$ to the pyrotechnic charge housed at 13, 14, which tends to eject the decoy-bearing sliding portion. This ejection must overcome the inflated resilient seals in the grooves 12 and 28, which will therefore restrain the ejection force, ensuring that ejection takes place at a low speed and without much recoil, which would be liable to tangle the decoys owing to the acceleration to which they would be subjected.

b) The sliding assembly is therefore slowly ejected due to combustion of the charge in the compartment 13, 14.

c) Ignition is then transmitted along the duct 15 to the pyrotechnic delay charge in the bore 16. When combustion of this is complete it will exert pressure on the ejector piston 3 in the bore 19, so causing removal of the cover 4.

d) The decoy-bearing member is of course normally ejected from an aircraft, transversely relative to the latter's trajectory. As soon as the cover is removed, the high turbulence produced by the speed relative to the air will progressively eject the decoy charges contained in the sliding portion, so ensuring excellent deployment of the decoys.

The same process will occur for the other decoy-bearing members in the same group, housed in the ceils $L_2$ to $L_4$ and energised after respective delays determined by the charges $I_2$, $I_3$ and $I_4$. Because the decoy-bearing members in the cells $L_2$ to $L_4$ have cover removal delays which are staggered according to their respective ejection delays, a trajectory deviating from the actual trajectory of the aircraft is simulated very simply and effectively while maintaining credible apparent deceleration of the clouds of decoys so produced.

It has been found however that when the radial velocity observed by the radar is high, it is advisable to increase the density of the decoy clouds to preserve credibility with respect to modern high-performance radar auto-directors. To this end, according to a feature of the present invention, electromagnetic decoy-bearing members arranged in two groups of respective cells and provided with different cover removal delays are fired in an intercalary manner. Although the intercalation sequences are determined by separate pyrotechnic chains, the fact that the primary initiation is by electrical means ensures intercalation with sufficient precision to give credibility vis-a-vis the best radar auto-directors.

Obviously, the present invention is not restricted to the embodiment described. In particular, it is possible where necessary to perforate the back portion 23 of the decoy-bearing sliding case, in particular to allow the passage of air and so improve ejection of the electromagnetic decoys. If necessary, too, it would be possible to fire jointly more than two groups of decoy-bearing members associated with more than two groups of cells, for example in order to perfect simulation of a false trajectory deviating from the aircraft with progressive deceleration, until the end of this trajectory has definitely freed the aircraft from the menace of the radar auto-directors pursuing it.

Moreover, the invention may also be used to create "penetration corridors" over hostile territory, in which case the cover removal delays will preferably be identical.

We claim:

1. A device for launching electromagnetic decoys comprising a launching structure equipped with at least one group of cells for housing respective decoy-bearing members, said cells being open at one end, at least one means for the initiation and sequential transmission of ignition to a first of said cells and then sequentially to each other cell; each decoy-bearing member comprising a case having wall means enclosing a space for receiving decoys, each said cell having an ejection charge associated therewith and each said case being disposable in a said cell so that ignition of a said respective ejection charge will be transmitted to said respective decoy-bearing member, said wall means of each said case having an opening through which the decoys are dispensed, the improvement comprising a cover slidably and removably received on said wall means so as to close said opening, each said case having means for removing said respective cover, a said case being slidably receivable in a said cell, each case having at one end thereof means for housing a cover removing charge and means for conveying the product of ignition of said ejection charge to activate said cover removing charge with activation thereof being effective to actuate said means for removing said cover, means for delayed action ignition transmission energizable by said ejection charge being provided, said device including means for delaying removal of said respective covers, said delaying removal means comprising, on each said decoy-bearing member at each end thereof a peripheral groove carrying therein each a resilient gas-filled hollow seal means for exerting a retaining action effective between a said case and the interior of a said cell to slow down the ejection of a said respective case from said respective cell.

2. The device as claimed in claim 1 wherein each said case has a portion at one end thereof for receiving a pyrotechnic charge, said wall means including side walls each having a groove and each cover including side walls having a bead for cooperating with a respective said groove, said portion having a peripheral wall on the interior surface of which a recessed surface is provided which extends toward said opening in said case, said cover having an extension for overlying at least a portion of said peripheral wall.

3. The device as claimed in claim 2 wherein said portion of said case at one end thereof includes a bore which ends in a zone with said recessed surface and which houses an ejector piston which, when activated by said pyrotechnic charge engages said cover to remove said cover from said case.

4. A device as claimed in claim 3, characterised in that the piston (3) comprises a recess (32) for an O-ring seal.

5. A device as claimed in claim 4, characterised in that the recessed sides (24, 25) of the sliding portion are provided with a longitudinal groove (24A, 25A), whereas the sides (43, 44) of the cover comprise corresponding longitudinal projections (43A, 44A) enabling the cover to be clipped onto the sliding case.

6. A device as claimed in claim 1, characterised in that the various decoy-bearing members in the group are provided with staggered cover removal delays.

7. A device as claimed in claim 1, characterised in that at least two groups of cells are provided and are designed to eject in intercalary manner two groups of decoy-bearing members having different cover removal delays.

8. A device as claimed in claim 1, characterised in that the various members in the group have the same cover removal delay.

* * * * *

UNITED STATES PATENT AND TRADEMARK OFFICE
CERTIFICATE OF CORRECTION

PATENT NO. : 5,602,362
DATED : February 11, 1997
INVENTOR(S) : BILLARD et al.

It is certified that error appears in the above-indentified patent and that said Letters Patent is hereby corrected as shown below:

On title page, insert item [73] to read as follows:

--Assignee: Societe E. Lacroix - Tous Artifices, Muret, France--.

Signed and Sealed this

Fifth Day of October, 1999

Attest:

Q. TODD DICKINSON

Attesting Officer

Acting Commissioner of Patents and Trademarks